US007469609B2

(12) United States Patent
Baldwin

(10) Patent No.: US 7,469,609 B2
(45) Date of Patent: *Dec. 30, 2008

(54) OUTPUT REDUCTION DUAL CLUTCH TRANSMISSION WITH CLUTCH COUPLER

(75) Inventor: Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/476,321

(22) Filed: Jun. 28, 2006

(65) Prior Publication Data

US 2008/0000311 A1 Jan. 3, 2008

(51) Int. Cl.
*F16H 3/093* (2006.01)

(52) U.S. Cl. .......................................... 74/330; 74/331

(58) Field of Classification Search .................. 74/330, 74/331

See application file for complete search history.

(56) References Cited

U.S. PATENT DOCUMENTS 4,461,188 A 7/1984 Fisher
5,392,665 A * 2/1995 Muller ........................ 74/330
5,823,051 A 10/1998 Hall, III
5,890,392 A 4/1999 Ludanek et al.
5,915,512 A 6/1999 Adamis et al.
5,950,781 A 9/1999 Adamis et al.
5,974,905 A 11/1999 Hedman
6,021,684 A 2/2000 Alfredsson
6,209,406 B1 4/2001 Sperber et al.
6,244,123 B1 6/2001 Hegerath et al.
6,250,171 B1 * 6/2001 Sperber et al. ................ 74/331
6,460,425 B1 10/2002 Bowen
6,595,077 B1 * 7/2003 Geiberger et al. ............. 74/330
6,675,668 B2 1/2004 Schamscha
6,755,089 B2 6/2004 Hirt
6,766,705 B1 7/2004 Hall, III
6,808,054 B2 10/2004 Hirt et al.
6,883,394 B2 4/2005 Koenig et al.
6,887,184 B2 5/2005 Buchanan et al.
6,898,992 B2 5/2005 Koenig et al.
7,246,536 B2 * 7/2007 Baldwin ...................... 74/340
7,249,532 B2 * 7/2007 Ruedle ........................ 74/330
7,267,022 B2 * 9/2007 Gumpoltsberger et al. .... 74/331
2003/0154810 A1 8/2003 Hedmann
2004/0149080 A1 8/2004 Pollak
2005/0103140 A1 5/2005 Gumpoltsberger
2005/0150318 A1 7/2005 Baldascini et al.
2005/0211007 A1 9/2005 Suzuki et al.
2005/0247147 A1 11/2005 Gumpoltsberger et al.
2006/0021456 A1 2/2006 Hughes
2006/0048593 A1 3/2006 Gumpoltsberger et al.
2006/0048594 A1 3/2006 Gumpoltsberger et al.

FOREIGN PATENT DOCUMENTS

EP 1837553 9/2007
WO WO2007009594 1/2007

* cited by examiner

*Primary Examiner*—Sherry Estremsky
(74) *Attorney, Agent, or Firm*—David B. Kelley; MacMillan, Sobanski & Todd, LLC

(57) ABSTRACT

A multiple speed power transmission includes an input, first and second input shafts, first and second clutches for releasably coupling the input to the input shafts, and a set of selectable power paths connecting the first and second input shafts to the output, the power paths having at least one power path that includes both the first and second input shafts.

18 Claims, 2 Drawing Sheets

| GEAR/PINION | | NUMBER OF TEETH |
|---|---|---|
| G1 | 30 | 73 |
| G2 | 32 | 37 |
| G3 | 24 | 31 |
| G4 | 40 | 22 |
| G5 | 46 | 16 |
| G6 | 50 | 16 |
| G7 | 56 | 37 |
| G8 | 59 | 38 |
| G9 | 34 | 34 |
| G10 | 38 | 30 |
| G11 | 26 | 51 |
| G12 | 42 | 29 |
| G13 | 48 | 41 |
| G14 | 52 | 38 |
| G15 | 54 | 42 |
| G16 | 58 | 23 |

FIG. 2

| GEAR | SPEED RATIO | STEP |
|---|---|---|
| 1st | 5.284 | |
| 2nd | 4.234 | 1.248 |
| 3rd | 2.718 | 1.558 |
| 4th | 1.875 | 1.449 |
| 5th | 1.340 | 1.400 |
| 6th | 1.000 | 1.340 |
| 7th | 0.770 | 1.300 |
| 8th | 0.617 | 1.248 |
| R1 | -4.897 | |
| R2 | -3.924 | 1.248 |
| SPAN | 8.57 | |

FIG. 3

OUTPUT REDUCTION DUAL CLUTCH TRANSMISSION WITH CLUTCH COUPLER

BACKGROUND OF THE INVENTION

This invention relates to automatic transmissions having a layshaft kinematic arrangement, particularly to automatic transmissions having dual input clutches, but no torque converter.

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open hydraulic friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio, and then restoring torque at the input. A primary functional feature of ASM transmissions is the need to interrupt power transmitted from the engine to the transmission input shaft before or during each gear ratio change.

Dual clutch layshaft transmissions are essentially two ASM transmissions, one providing odd numbered gears and one providing even numbered gears. Shifts between odd numbered gears and even numbered gears can be accomplished without interrupting power flow. While operating in an odd numbered gear, couplers can be actuated to configure the transmission for the next even numbered gear. Dual clutch transmissions have parasitic losses only slightly higher than ASM transmissions.

When a motor vehicle is accelerated from rest, the mechanical power generated by the engine exceeds the power utilized by the vehicle. The transmission must dissipate the difference, generally as heat. Open torque converters are very efficient at converting the excess mechanical power into heat in the working fluid. Friction clutches, as used in ASM and dual clutch transmissions, are limited in the rate at which they can dissipate the excess power. The amount of energy that must be dissipated is determined by the torque level, the speed difference across the clutch, and the duration of the event.

The most effective way to limit the power that must be dissipated by the clutch is to provide additional torque multiplication in the gearbox. This has two benefits. First, it reduces the torque which the clutch must transmit. Second, it reduces the duration of the event because the gearbox input will become equal to the engine speed at a lower vehicle speed. The need for similar top gear ratios, which is dictated by cruising fuel economy, is unchanged, so the resulting gearbox must have substantially more total span. The difference between adjacent gear ratios is limited by the ability to make comfortable shifts. As a result, it is also necessary to increase the number of discrete gear ratios.

One reverse ratio has been considered sufficient, since speed is relatively low and fuel efficiency in reverse is not a significant concern. However, if the gear multiplication is high enough to satisfy clutch thermal considerations, it may be excessive for normal reverse driving, even at those relatively low speeds. Therefore, it is beneficial to provide a reverse ratio similar to the traditional reverse ratio in addition to one that has much more multiplication.

A way to increase the gear multiplication is to increase to ratio of the tooth counts for individual gear pairs. This would require increasing the distance between shafts due to limitations on how small the gears can be relative to the shaft diameter. Adding an additional forward and reverse ratio would ordinarily require at least four additional gears and an additional synchronizer sleeve. The resulting transmission would be much larger and likely would not fit into the package space available.

For example, using a dual clutch transmission in a truck requires a very high torque ratio to launch the truck from rest due to its heavy load especially on a grade. But it also requires low torque ratios for efficient highway cruising when the vehicle is lightly loaded and on level ground. Typically, layshaft transmissions accommodate these requirements by increasing the distance between the shafts, resulting in a transmission that is large and heavy.

SUMMARY OF THE INVENTION

A multiple speed power transmission that overcomes these difficulties includes an input, an output, first and second input shafts, and first and second clutches releasably coupling the input to the first and second input shafts, respectively. A first pinion is secured to the first input shaft, and a first gear secured to a layshaft is in continuous meshing engagement with the first pinion. A second gear is journalled on the layshaft, and a second pinion secured to the second input shaft is in continuous meshing engagement with the second pinion. A first coupler secured to the layshaft releasably couples the second gear to the layshaft. A first set of selectable power paths connects the first input shaft to the output, and a second set of selectable power paths connects the second input shaft to the output.

An advantage of this transmission is achieving the span with a smaller center distance compared to a conventional output reduction dual clutch arrangement. Also, a second reverse ratio and top gear ratio is available without requiring additional hardware. This arrangement allows the third forward gear and the second reverse gear to be activated concurrently, which is advantageous for rock cycling maneuvers.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which:

FIG. 2 is a chart containing a preferred number of teeth for each of the gears and pinions of the transmission of FIG. 1; and FIG. 3 is a chart containing the speed ratios between the input and output, and steps between the speed ratios for each of the forward and reverse gears of the transmission of FIG. 1.

DESCRIPTION OF THE PREFERRED EMBODIMENT

Figure 1:
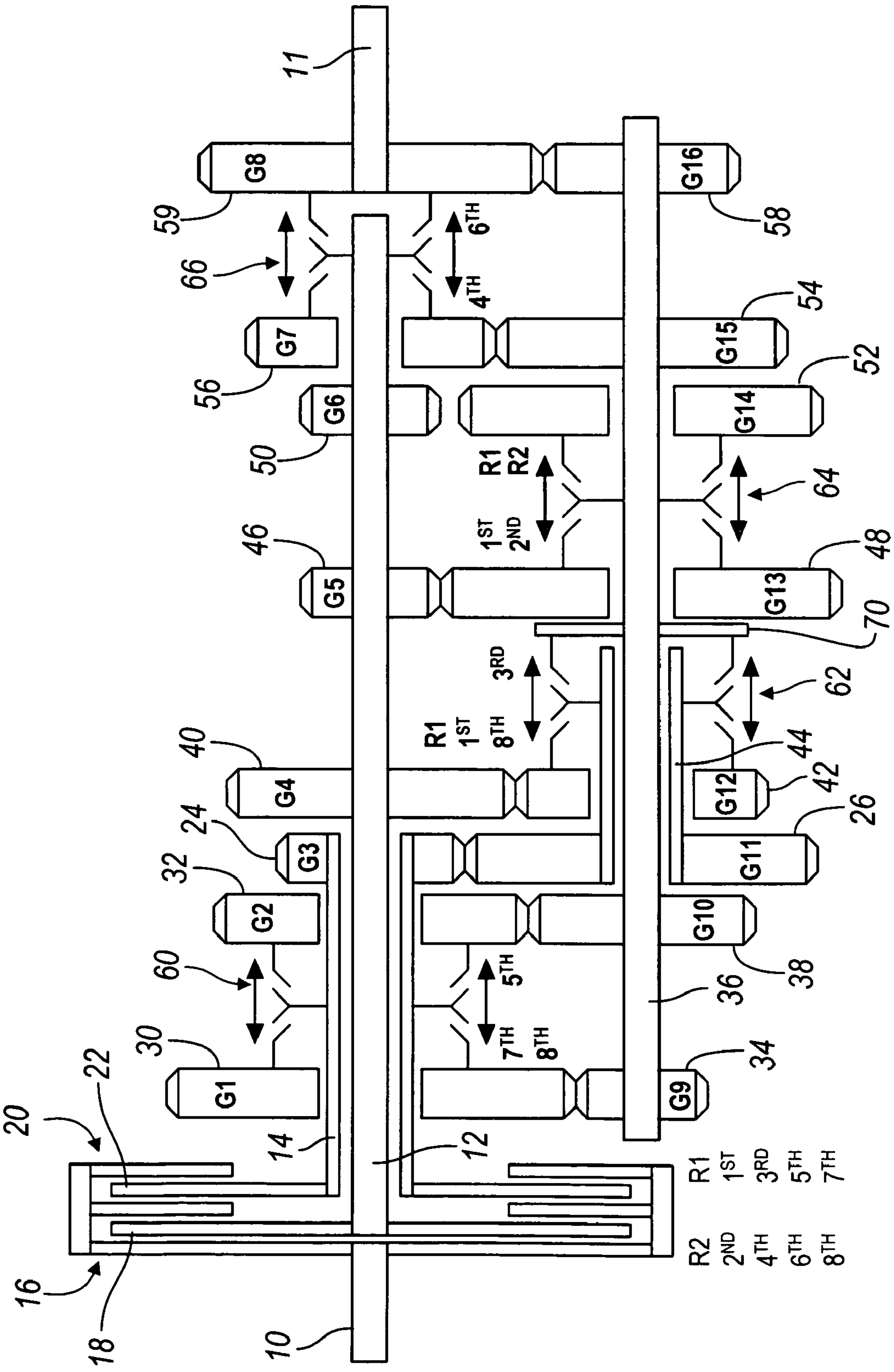
FIG. 1 is a schematic diagram of an eight forward gear, two reverse gear transmission embodiment.

Referring to FIG. 1, a first embodiment of a transmission includes an input 10 driveably connected to a power source, such as an internal combustion engine or electric motor, and an output 11 for driving a load, such as the driven wheels of a motor vehicle, through a powertrain that may include a drive shaft, differential mechanism, and axle shafts. A first friction clutch 20, which includes a clutch housing and clutch disc 22, alternately driveably connects and disconnects a first input shaft 14 as clutch 20 is engaged and disengaged, respectively. A second friction clutch 16, which includes a clutch housing and a clutch disc 18, driveably connects and disconnects a second input shaft 12 as clutch 16 is engaged and disengaged, respectively.

Couplers 60, 62, 64, 66 are preferably synchronizers of the type used in automotive manual transmissions to connect a gear or pinion to a shaft, after synchronizing the speed of the shaft and that of the pinion or gear, and to disconnect the shaft and the associated pinion or gear. Such synchronizers include dog teeth on the gear or pinion, which engage teeth on a selector sleeve, which moves leftward and rightward from a neutral position to produce engagement. Alternatively, each coupler may be a dog clutch having teeth that are engaged with dog teeth on a gear or pinion without synchronizing the speed of the shaft with that of the pinion or gear. This invention may use couplers in any combination of synchronizers and dog clutches. Each coupler includes a hub secured to the shaft and the selector sleeve, which is supported on the hub such that it slides leftward and rightward into engagement with dog teeth on the adjacent gear or pinion.

In the case where a coupler is a synchronizer, it is provided with a conical surface, which engages mutually with a corresponding conical surface located on the gear or pinion. When the synchronizer is engaging with either of its adjacent gears, these conical surfaces are forced together into frictional contact, which synchronizes the speed of the gear to that of the shaft before the dog teeth engage.

Coupler 60 driveably connects input shaft 14 to pinions 30, 32, and it disconnects those pinions from shaft 14. Coupler 62 driveably connects layshaft 44 to pinion 42 and layshaft 36, and it disconnects pinion 42 and layshaft 36 from layshaft 44. Coupler 64 driveably connects layshaft 36 to gears 48, 52, and it disconnects those gears from layshaft 36. Coupler 66 driveably connects input shaft 12 to pinion 56, gear 59, and it disconnects those pinion 56 and gear 59 from input shaft 12. A disc 70, secured to layshaft 36, carries a conical synchronizing surface and dog teeth, which complete a drive connection between layshafts 44, 36 through coupler 62.

Input shaft 14 supports a pinion 24, which is secured to the shaft and in continuous meshing engagement with a gear 26, which is secured to an auxiliary layshaft 44. Input shaft 14 also supports two pinions 30, 32, which are journalled on shaft 14. Pinion 30 is in meshing engagement with gear 34, which is secured to layshaft 36. Pinion 32 is in meshing engagement with gear 38, which is secured to layshaft 36.

Input shaft 12 supports a gear 40, which is secured to shaft 12 and is in continuous meshing engagement with pinion 42, which is journalled on layshaft 44.

A pinion 46 is secured to input shaft 12 and is in continuous meshing engagement with a gear 48, journalled on layshaft 36. Similarly, pinion 50 is secured to input shaft 12 and is in continuous meshing engagement with an idler gear (not shown). The idler gear is in continuous meshing engagement with a gear 52, journalled on layshaft 36.

Gear 54 is secured to layshaft 36 and is in continuous meshing engagement with a pinion 56, journalled on input shaft 12. Similarly, output pinion 58 is secured to layshaft 36 and is in continuous meshing engagement with output gear 59, which is secured to output 11.

In first gear and low reverse (R1), coupler 62 driveably connects pinion 42 and layshaft 44 through a power path, which driveably connects the first and second input shafts 14, 12. The power path includes input shaft 14, pinion 24, gear 26, auxiliary layshaft 44, coupler 62, pinion 42, gear 40, and input shaft 12.

To accelerate the vehicle using the first forward gear, coupler 62 engages pinion 44, coupler 64 engages gear 48, and couplers 60, 66 are disengaged. Clutch 20 is engaged and clutch 16 is disengaged. The power path for the first speed ratio includes input 10, clutch 20, input shaft 14, pinion 24, gear 26, auxiliary layshaft 44, coupler 62, pinion 42, gear 40, input shaft 12, pinion 46, gear 48, coupler 64, layshaft 36, output pinion 58, output gear 59, and output 11. Input 10 is driveably connected to input shaft 14 through clutch 20. Layshaft 44 is driveably connected to pinion 42 through coupler 62. Gear 48 is driveably connected to layshaft 36 through coupler 64. The speed ratio for first gear is 5.248 when the gears and pinions have the number of teeth shown in FIG. 2.

To shift from first gear to second gear, coupler 64 remains engaged with pinion 48, clutch 16 is progressively engaged, and clutch 20 is progressively disengaged. The power path for second gear includes input 10, clutch 16, input shaft 12, pinion 46, gear 48, coupler 64, layshaft 36, output pinion 58, output gear 59, and output 11. Input 10 is driveably connected to input shaft 12 and pinion 46 through clutch 16. Pinion 46 drives gear 48, which is driveably connected to layshaft 36 through coupler 64. Pinion 58, secured to layshaft 36, drives output gear 59 and output 11. The speed ratio for second gear is 4.234, when the gears and pinions have the number of teeth shown in FIG. 2. Coupler 62 may be disengaged after torque is transferred to the second gear power path.

To shift from the second gear to third gear, coupler 62 engages disc 70, clutch 16 is progressively disengaged, and clutch 20 is progressively engaged. Following the 2-3 shift, coupler 64 is moved to the neutral position. The power path for third gear includes input 10, clutch 20, input shaft 14, pinion 24, gear 26, layshaft 44, coupler 62, disc 70, layshaft 36, output pinion 58, output gear 59, and output 11. Input 10 is driveably connected to input shaft 14 and pinion 24 through clutch 20. Pinion 24 drives gear 26, which is driveably connected to layshaft 36 through coupler 62. Pinion 58, secured to layshaft 36, drives output gear 59 and output 11. The speed ratio for third gear is 2.718, when the gears and pinions have the number of teeth shown in FIG. 2.

To shift from third gear to fourth gear, coupler 66 engages gear 59, clutch 16 is progressively engaged, and clutch 20 is progressively disengaged. Following the 3-4 shift, coupler 66 is moved to the neutral position. The power path for fourth gear includes input 10, clutch 16, input shaft 12, coupler 66, pinion 56, gear 54, layshaft 36, output pinion 58, output gear 59, and output 11. Input 10 is driveably connected to input shaft 12 through clutch 16. Coupler 66 driveably connects input shaft 12 to pinion 56, which drives gear 54, layshaft 36 and output pinion 58. Output gear 59 and output 11 are driven by output pinion 58. The speed ratio for fourth gear is 1.875, when the gears and pinions have the number of teeth shown in FIG. 2.

To shift from fourth gear to fifth gear, coupler 60 engages pinion 32, clutch 20 is progressively engaged, and clutch 16 is progressively disengaged. Following the 4-3 shift, coupler 66 is moved to the neutral position. The power path for fifth gear includes input 10, clutch 20, input shaft 14, coupler 60, pinion 32, gear 38, layshaft 36, output pinion 58, output gear 59, and output 11. Input 10 is driveably connected to input shaft 14 through clutch 20. Coupler 60 driveably connects pinion 32 and input shaft 14. Pinion 32 drives gear 38, layshaft 36 and output pinion 58, which drives output gear 59 and output 11. The speed ratio for fifth gear is 1.340, when the gears and pinions have the number of teeth shown in FIG. 2.

To shift from fifth gear to sixth gear, coupler 66 engages output gear 59, clutch 16 is progressively engaged, and clutch 20 is progressively disengaged. Following the 5-6 shift, coupler 60 is moved to the neutral position. The power path for sixth gear includes input 10, clutch 16, input shaft 12, coupler 66, output gear 59, and output 11. Input 10 is driveably connected to input shaft 12 through clutch 16. Coupler 66 driveably connects input shaft 12 to output gear 59 and output 11. Sixth gear is a direct drive gear, whose speed ratio is 1.000.

To shift from sixth gear to seventh gear, coupler 60 engages pinion 30, clutch 20 is progressively engaged, and clutch 16 is progressively disengaged. Following the 6-7 shift, coupler 66 is moved to the neutral position. The power path for seventh gear includes input 10, clutch 20, input shaft 14, coupler 60, pinion 30, gear 34, layshaft 36, output pinion 58, output gear 59, and output 11. Input 10 is driveably connected to input shaft 14 through clutch 20. Coupler 60 driveably connects pinion 30 and input shaft 14. Pinion 30 drives gear 34, layshaft 36 and output pinion 58, which drives output gear 59 and output 11. The speed ratio for seventh gear is 0.770, when the gears and pinions have the number of teeth shown in FIG. 2.

To upshift from seventh gear to eighth gear, coupler 62 engages pinion 42, clutch 16 is progressively engaged, and clutch 20 is progressively disengaged. The power path for eighth gear includes input 10, clutch 16, input shaft 12, gear 40, pinion 42, coupler 62, layshaft 44, gear 26, pinion 24, input shaft 14, coupler 60, pinion 30, gear 34, layshaft 36, output pinion 58, output gear 59, and output 11. Input 10 is driveably connected to input shaft 12 and gear 40 through clutch 16. Gear 40 drives pinion 42, which is driveably connected to layshaft 44 through coupler 62. Gear 26, secured to layshaft 44, drives pinion 24 and input shaft 14. Coupler 60 driveably connects input shaft 14 and pinion 30, which drives gear 34, layshaft 36, output pinion 58, output gear 59, and output 11. The speed ratio for eight gear is 0.617, when the gears and pinions have the number of teeth shown in FIG. 2.

Each downshift is accomplished by reversing the steps of the corresponding upshift.

To accelerate the vehicle in a low reverse gear (R1), coupler 62 engages pinion 42, coupler 64 engages gear 52, couplers 60, 66 are disengaged, and clutch 20 is engaged. The power path for low reverse gear includes input 10, clutch 20, input shaft 14, pinion 24, gear 26, layshaft 44, coupler 62, pinion 42, gear 40, input shaft 12, pinion 50, an idler gear (not shown), gear 52, coupler 64, layshaft 36, output pinion 58, output gear 59, and output 11. Input 10 is driveably connected to shaft 14 through clutch 20. Shaft 14 is drives pinion 24, which drives gear 26. Coupler 62 driveably connects pinion 42 and layshaft 44. Pinion 42 drives gear 40, input shaft 12 and pinion 50, which drives a reverse idler (not shown) and gear 52. Coupler 64 driveably connects gear 52 to layshaft 36, which drives output pinion 58 output gear 59 and output 11. The speed ratio for the first reverse gear is −4.897, when the gears and pinions have the number of teeth shown in FIG. 2.

To shift from the first reverse gear to a second reverse gear, coupler 64 remains engaged to gear 52, clutch 16 is progressively engaged, and clutch 20 is progressively disengaged. The power path for the second reverse gear includes input 10, clutch 16, input shaft 12, pinion 50, gear 52, coupler 64, layshaft 36, output pinion 58, output gear 59, and output 11. Input 10 is driveably connected to shaft 12 through clutch 16. Reverse pinion 50 drives its reverse idler (not shown) and reverse gear 52. Coupler 64 driveably connects gear 52, layshaft 36 and output pinion 58, which drives output gear 59 and output 11. The speed ratio for the second reverse gear is −3.924, when the gears and pinions have the number of teeth shown in FIG. 2.

In accordance with the provisions of the patent statutes, the preferred embodiment has been described. However, it should be noted that the alternate embodiments can be practiced otherwise than as specifically illustrated and described.

What is claimed is:

1. A transmission, comprising:

an input;

first and second input shafts;

first and second clutches releasably coupling the input to the first and second input shafts, respectively;

a layshaft;

an output;

power paths connecting the input to the output including at least one power path that includes both the first and second input shafts and the layshaft and a second power path wherein power is transmitted from the input and the second input shaft to the first input shaft and the output.

2. The transmission of claim 1 wherein the first and second input shafts are substantially co-axial.

3. The transmission of claim 1 wherein power is transmitted from the input and the first input shaft through a first power path to the second input shaft and the output.

4. The transmission of claim 1, wherein power is transmitted from the input and the second input shaft through a second power path to the first input shaft and the output, the second power path including:

first pinion secured to the second input shaft;

a first gear secured to the layshaft and in continuous meshing engagement with a first pinion;

second gear journalled on the layshaft;

a second pinion secured to the first input shaft; and a first coupler secured to the layshaft for driveably connecting the second gear to the layshaft.

5. The transmission of claim 1, wherein power is transmitted from the input and the first input shaft through a first power path to the second input shaft and the output, the first power path including:

a first pinion secured to the second input shaft;

a first gear secured to the layshaft and in continuous meshing engagement with the first pinion;

second gear journalled on the layshaft;

a second pinion secured to the first input shaft; and a first coupler secured to the layshaft for driveably connecting the second gear to the layshaft.

6. The transmission of claim 5, further comprising:

an output gear secured to the output;

a second layshaft;

an output pinion secured to the second layshaft and in continuous meshing engagement with the output gear; and a third pinion journalled on the first input shaft;

a third gear secured to the second layshaft and in continuous meshing engagement with the third pinion; and a second coupler secured to the first input shaft, for releasably coupling the third pinion and the first input shaft.

7. The transmission of claim 5, further comprising:

an output gear secured to the output;

a second layshaft;

an output pinion secured to the second layshaft and in continuous meshing engagement with the output gear; and a third pinion journalled on the first input shaft;

a third gear secured to the second layshaft and in continuous meshing engagement with the third pinion;

a fourth pinion journalled on the second input shaft;

a fourth gear secured to the second layshaft and in continuous meshing engagement with the fourth pinion; and a second coupler secured to the first input shaft, for alternately releasably coupling the third pinion to the first input shaft and the output gear to the first input shaft.

8. The transmission of claim 5, further comprising:

an output gear secured to the output;

a second layshaft; and an output pinion secured to the second layshaft and in continuous meshing engagement with the output gear;

wherein the first coupler releasably couples the first gear to the second layshaft.

9. The transmission of claim 1, wherein power is transmitted from the input and the second input shaft through a second power path to the first input shaft and the output, and the second power path includes:

a first pinion secured to the second input shaft;

a first gear secured to the layshaft and in continuous meshing engagement with the first pinion;

second gear journalled on the layshaft;

a second pinion secured to the first input shaft;

a first coupler secured to the layshaft for driveably connecting the second gear to the layshaft;

an output gear secured to the output;

a second layshaft;

an output pinion secured to the second layshaft and in continuous meshing engagement with the output gear; and a fifth pinion secured to the first input shaft;

a fifth gear journalled on the second layshaft and in continuous meshing engagement with the fifth pinion; and a third coupler secured to the second layshaft, for releasably coupling the fifth gear and the second layshaft.

10. The transmission of claim 1, wherein power is transmitted from the input and the second input shaft through a second power path to the first input shaft and the output, and the second power path includes:

a first pinion secured to the second input shaft;

a first gear secured to the layshaft and in continuous meshing engagement with a first pinion;

second gear journalled on the layshaft;

a second pinion secured to the first input shaft;

a first coupler secured to the layshaft for driveably connecting the second gear to the layshaft;

an output gear secured to the output;

a second layshaft;

an output pinion secured to the second layshaft and in continuous meshing engagement with the output gear;

a fifth pinion secured to the first input shaft;

a fifth gear journalled on the second layshaft and in continuous meshing engagement with the fifth pinion;

a sixth pinion secured to the second input shaft;

a sixth gear journalled on the second layshaft and in continuous meshing engagement with the sixth pinion; and a third coupler secured to the second layshaft, for alternately releasably coupling the fifth gear to second layshaft and the sixth gear to the second layshaft.

11. The transmission of claim 1, wherein power is transmitted from the input and the second input shaft through a second power path to the first input shaft and the output, and the second power path includes:

a first pinion secured to the second input shaft;

a first gear secured to the layshaft and in continuous meshing engagement with a first pinion;

second gear journalled on the layshaft;

a second pinion secured to the first input shaft;

a first coupler secured to the layshaft for driveably connecting the second gear to the layshaft;

an output gear secured to the output;

a second layshaft;

an output pinion secured to the second layshaft and in continuous meshing engagement with the output gear; and wherein the second set of selectable power paths comprises:

a seventh pinion journalled on the second input shaft;

a seventh gear secured to the second layshaft and in continuous meshing engagement with the seventh pinion; and a fourth coupler secured to the second input shaft, for releasably coupling the seventh pinion to the second input shaft.

12. A transmission, comprising:

an input;

an output secured to an output gear;

first and second input shafts;

first and second clutches releasably coupling the input to the first and second input shafts, respectively;

a first pinion secured to the first input shaft;

a first gear secured to a layshaft and in continuous meshing engagement with the first pinion;

a second gear journalled on the layshaft;

a second pinion secured to the second input shaft and in continuous meshing engagement with the second gear;

a first coupler secured to the layshaft for releasably coupling the second gear to the layshaft;

an output pinion secured to a second layshaft in continuous meshing engagement with the output gear;

first power paths comprises the first coupler and connecting the first input shaft to the output; and second power paths connecting the second input shaft to the output.

13. The transmission of claim 12, further comprising:

an output gear secured to the output;

a second layshaft;

an output pinion secured to the second layshaft and in continuous meshing engagement with the output gear; and wherein the first power paths include:

a third pinion journalled on the first input shaft;

a third gear secured to the second layshaft and in continuous meshing engagement with the third pinion; and a second coupler secured to the first input shaft, for releasably coupling the third pinion and the first input shaft.

14. The transmission of claim 12, further comprising:

an output gear secured to the output;

a second layshaft;

an output pinion secured to the second layshaft and in continuous meshing engagement with the output gear; and wherein the first power paths include:

a third pinion journalled on the first input shaft;

a third gear secured to the second layshaft and in continuous meshing engagement with the third pinion;

a fourth pinion journalled on the first input shaft;

a fourth gear secured to the second layshaft and in continuous meshing engagement with the fourth pinion; and a second coupler secured to the first input shaft, for alternately releasably coupling the third pinion to the first input shaft and the fourth pinion to the first input shaft.

15. The transmission of claim 12, further comprising:

an output gear secured to the output;

a second layshaft;

an output pinion secured to the second layshaft and in continuous meshing engagement with the output gear; and wherein the second power paths include:

a fifth pinion secured to the second input shaft;

a fifth gear journalled on the second layshaft and in continuous meshing engagement with the fifth pinion; and a third coupler secured to the second layshaft, for releasably coupling the fifth gear and the second layshaft.

16. The transmission of claim 12, further comprising:

an output gear secured to the output;

a second layshaft;

an output pinion secured to the second layshaft and in continuous meshing engagement with the output gear; and wherein the second power paths include:

a fifth pinion secured to the second input shaft;

a fifth gear journalled on the second layshaft and in continuous meshing engagement with the fifth pinion;

a sixth pinion secured to the second input shaft;

a sixth gear journalled on the second layshaft and in continuous meshing engagement with the sixth pinion; and a third coupler secured to the second layshaft, for alternately releasably coupling the fifth gear to second layshaft and the sixth gear to the second layshaft.

17. The transmission of claim 12, further comprising:

an output gear secured to the output;

a second layshaft;

an output pinion secured to the second layshaft and in continuous meshing engagement with the output gear; and wherein the second power paths include:

a seventh pinion journalled on the second input shaft;

a seventh gear secured to the second layshaft and in continuous meshing engagement with the seventh pinion; and a fourth coupler secured to the second input shaft, for releasably coupling the seventh pinion to the second input shaft.

18. The transmission of claim 12, further comprising:

an output gear secured to the output;

a second layshaft;

an output pinion secured to the second layshaft and in continuous meshing engagement with the output gear; and wherein the second power paths include a fourth coupler secured to the second input shaft, for releasably coupling the output gear to the second input shaft.

* * * * *